United States Patent
Elwell

(12) 
(10) Patent No.: US 6,841,945 B1
(45) Date of Patent: Jan. 11, 2005

(54) LIGHTING CONTROL SYSTEM AND METHOD

(75) Inventor: Brian E. Elwell, Hawthorne, CA (US)

(73) Assignee: Novitas, Inc., Torrance, CA (US)

( * ) Notice: Subject to any disclaimer, the term of this patent is extended or adjusted under 35 U.S.C. 154(b) by 0 days.

(21) Appl. No.: 10/254,042

(22) Filed: Sep. 24, 2002

(51) Int. Cl.$^7$ .............................................. H05B 37/02
(52) U.S. Cl. ...................... 315/154; 315/153; 315/158; 315/DIG. 4
(58) Field of Search .................................. 315/291, 307, 315/312, 320, 322, DIG. 4, 224, 225, 209 R, 149, 150–159, 324

(56) References Cited

U.S. PATENT DOCUMENTS

| | | | | |
|---|---|---|---|---|
| 5,357,170 A | * | 10/1994 | Luchaco et al. | 315/159 |
| 5,406,173 A | * | 4/1995 | Mix et al. | 315/156 |
| 6,628,091 B2 | * | 9/2003 | Griffin et al. | 315/291 |

* cited by examiner

Primary Examiner—Tuyet T. Vo
(74) Attorney, Agent, or Firm—Fulwider Patton Lee & Utecht, LLP

(57) ABSTRACT

An energy-saving lighting control system for controlling a series of banks of lights in an area. The system activates less than all of the series of banks of lights upon entry into the area, regardless of the last light-activating setting selected by a user.

29 Claims, 5 Drawing Sheets

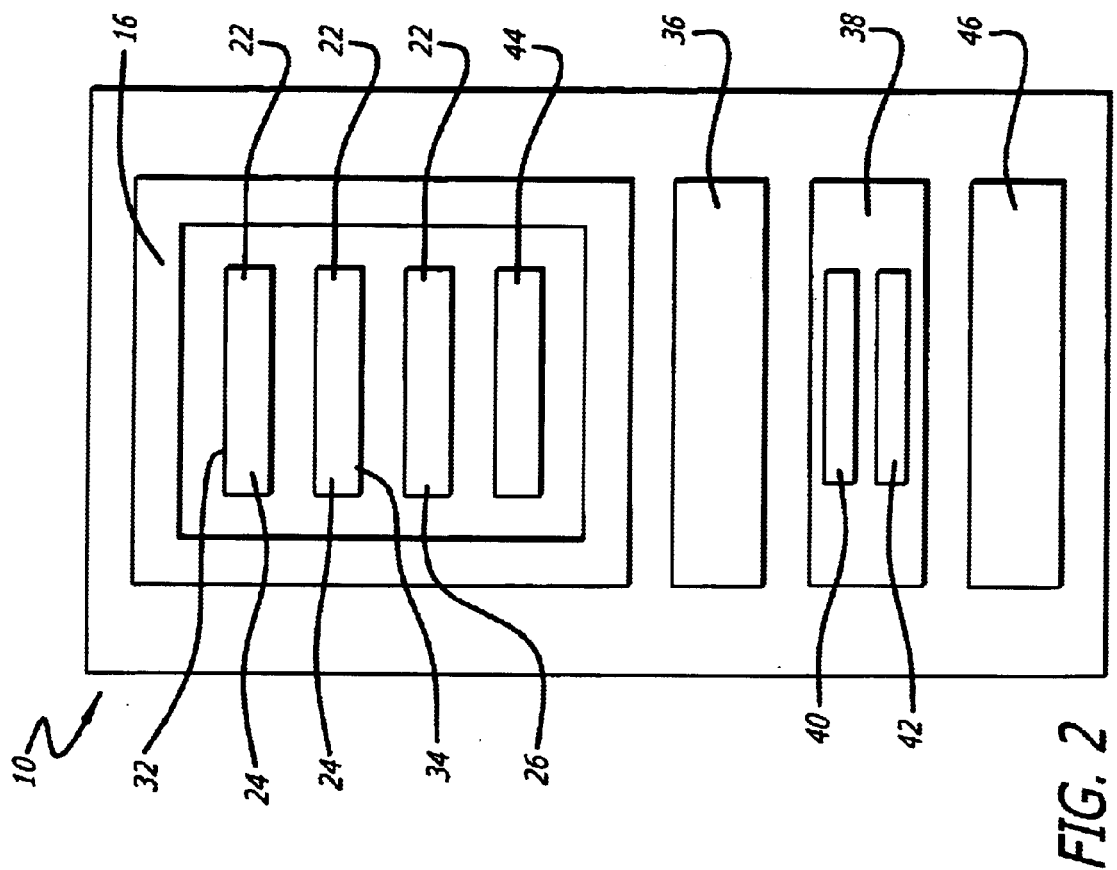
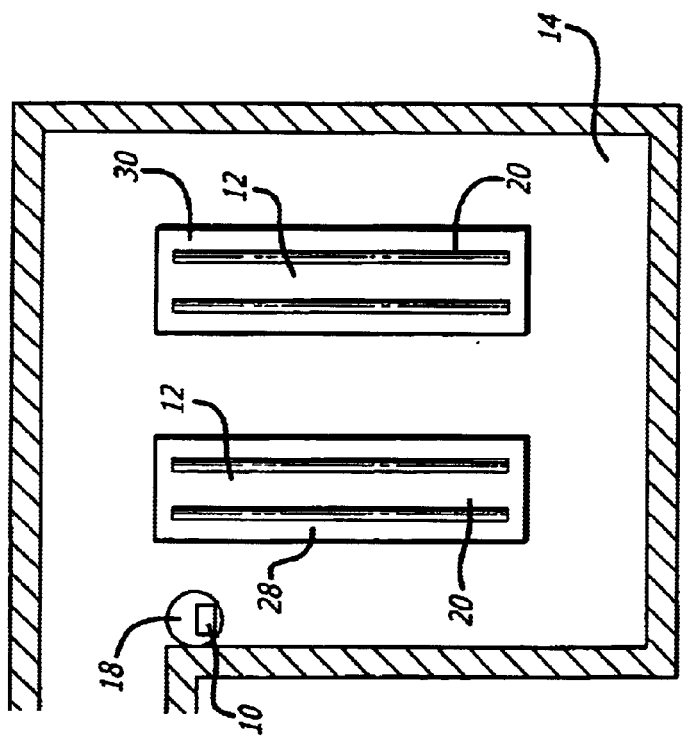
FIG. 2
FIG. 1

LIGHTING CONTROL SYSTEM AND METHOD

BACKGROUND OF THE INVENTION

1. Field of the Invention

The present invention relates generally to occupancy sensor systems and methods, and, more particularly, to an energy saving system and method for forcing only one of a series of banks of lighting to automatically activate upon initial detection of the occupancy of an area.

2. Description of the Related Art

An occupancy sensor system controls activation or deactivation of a system connected thereto responsive to sensing occupancy of an area covered thereby. The sensors in an occupancy sensor system may include infrared and/or ultrasonic technologies. The systems controlled thereby may consist of lighting systems, heating and air conditioning systems, alarm systems, and/or building automation systems. The area covered by an occupancy sensor may constitute a room, a class-room, a computer room, a section of a floor, and/or a floor in a building, anywhere from very small to very large areas. The occupancy sensor may be mounted at a location in the wall or in the ceiling of the area to be covered thereby.

Occupancy sensors conserve energy by activating and deactivating systems automatically depending upon occupancy of areas. Such energy conservation has been important for environmental and economic reasons, and has been mandated where such conservation is essential. In view of such considerations, increasingly offices and other areas utilize multiple groups or banks of lights. Grouping the lighting into separate banks allows occupants to select only a portion of the room lighting, thereby saving energy. Such selection is commonly used when performing computer based tasks, to reduce glare on the monitor. In several states, it is required that all offices use two sets of lights to implement energy savings and thereby reduce energy demand.

In individual offices, for instance, there may be two banks of light. Often the banks of lights are set up such that half of each fixture is part of each bank. However, it is often not readily apparent that both sets of lights are on. Further, other occupants, such as cleaning crews, may change the remembered setting from the primary occupant. Where the remembered setting is for all banks of lights to turn on upon entry into the area, energy is wasted.

Therefore, there has existed a need for a system which is capable of forcing automatic activation of only one of the banks of lights, regardless of the last light-activating setting selected by the user, to enforce a maximum amount of energy savings. The present invention fulfills these needs.

SUMMARY OF THE INVENTION

Briefly, and in general terms, the present invention provides enforced energy savings for lighting control systems.

The system activates only less than all of a series of banks of lights, upon sensing entry into an area which includes the series of banks of lights, regardless of the last light-activating setting selected by a user. The system is incorporated in an apparatus for sensing entry into the area. The system also includes multiple selectable light-activating settings. The systems comprises a selecting-enabling element, for enabling the selecting by the user of one of a plurality of light-activating settings for the plurality of banks of lights. The multiple light-activating settings include several less-than-all-banks-only settings for enabling the selecting of only less than all of the series of banks of lights, and an all-banks setting for enabling the selecting of all of the series of banks of lights. The system also comprises an activating element for activating only less than all of the series of banks of lights upon entry into the area regardless of the last of the series of light-activating settings selected by the user.

One aspect of the present invention is that the system provides efficient and effective energy savings by activating only one of a series of banks of lights upon entry into an area regardless of the last light-activating setting selected by the user.

Another aspect of the present invention is that the system forces automatic activation of only one of the series of banks of lights.

Other features and advantages will become apparent from the following detailed description, taken in conjunction with the accompanying drawings, which describe and illustrate, by way of example, the features of the invention.

BRIEF DESCRIPTION OF THE DRAWINGS

FIG. 1 is a block diagram illustrating a lighting control system in accordance with the present invention.

FIG. 2 is a block diagram illustrating a control section of the lighting control system in accordance with the present invention.

FIGS. 4-1 and 4-2(a,b) are sections of a flow chart illustrating a method of operation of the lighting control system in accordance with the present invention.

DETAILED DESCRIPTION OF THE PREFERRED EMBODIMENTS

Figures 1, 4:
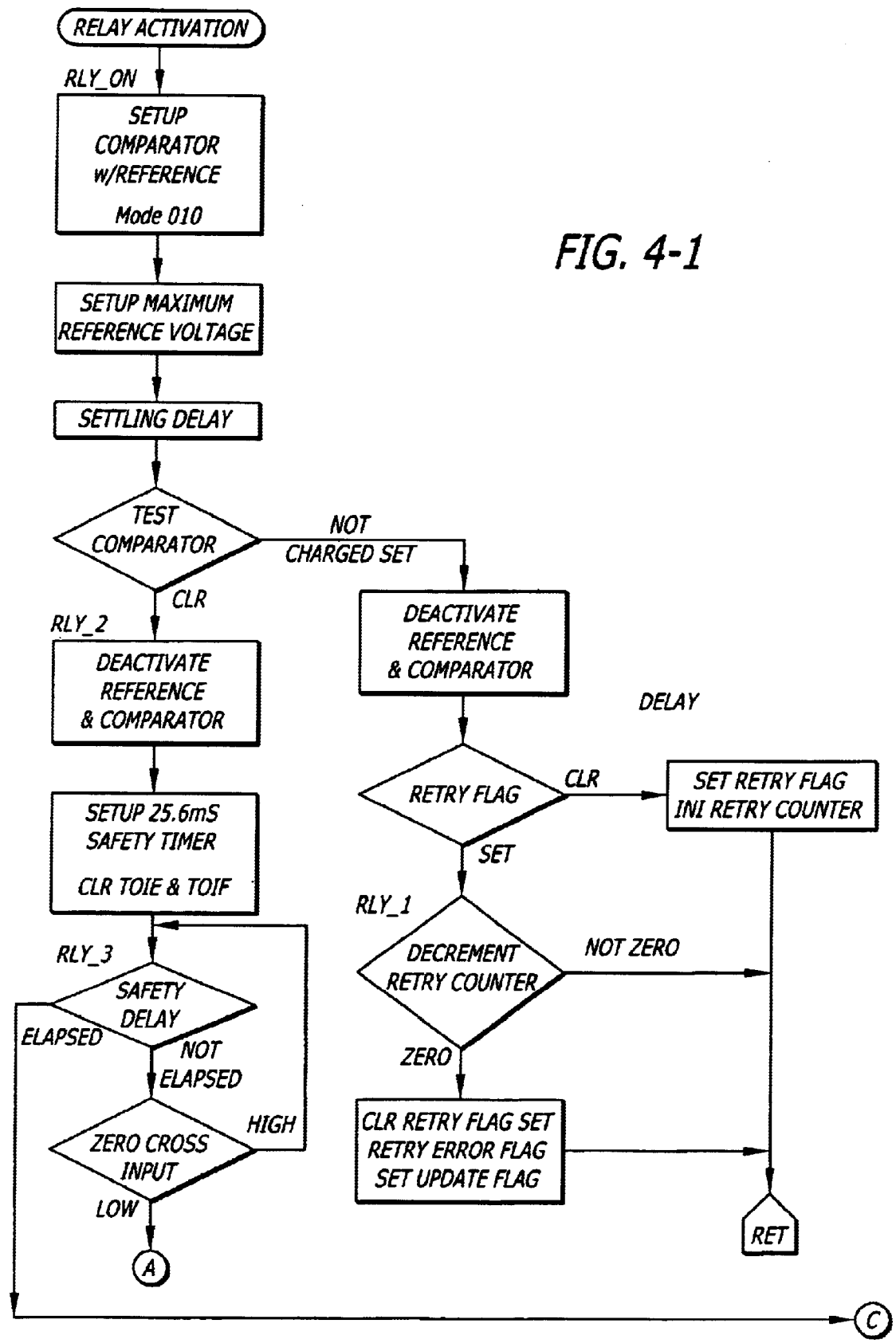
Figures 2A, 4:
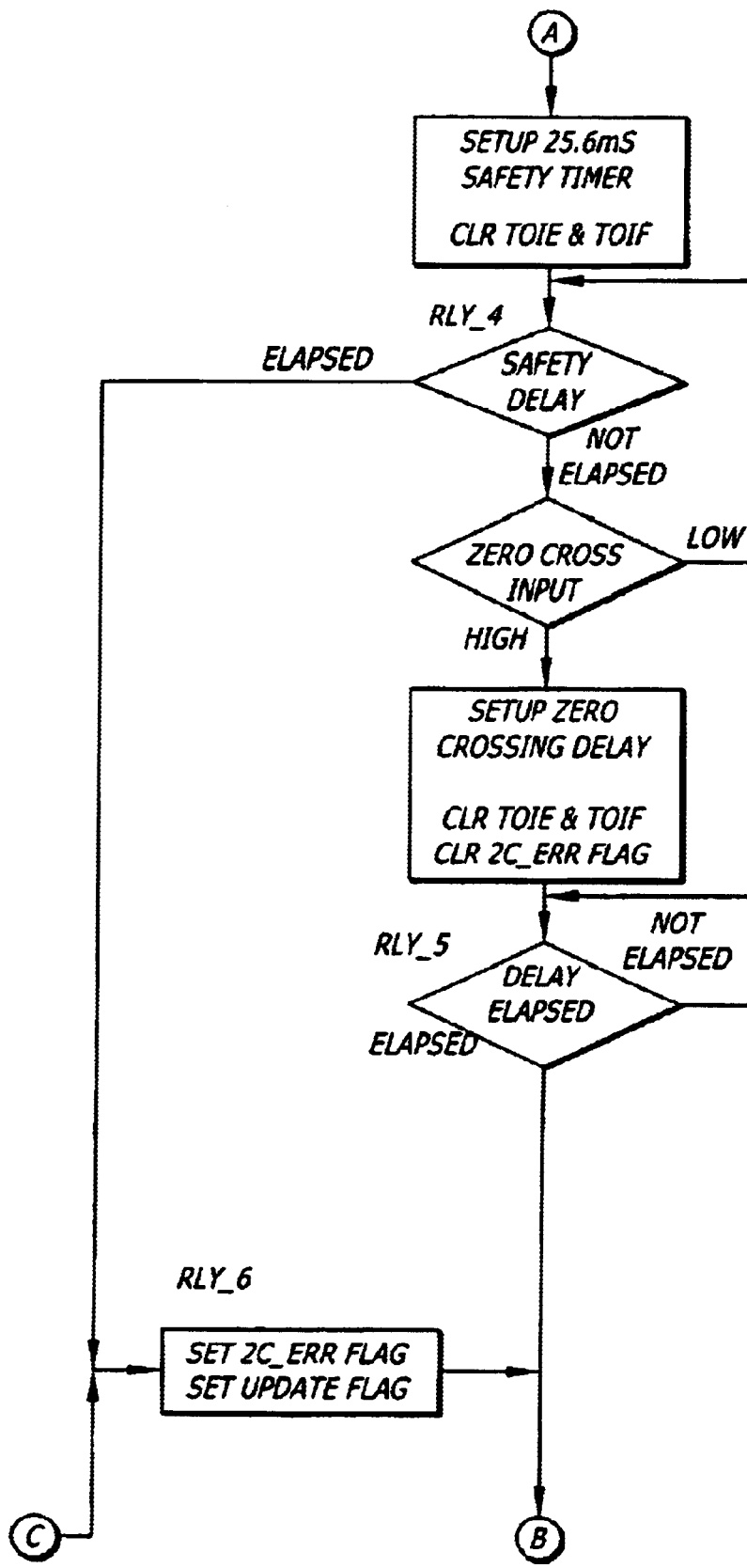
Figures 2B, 4:
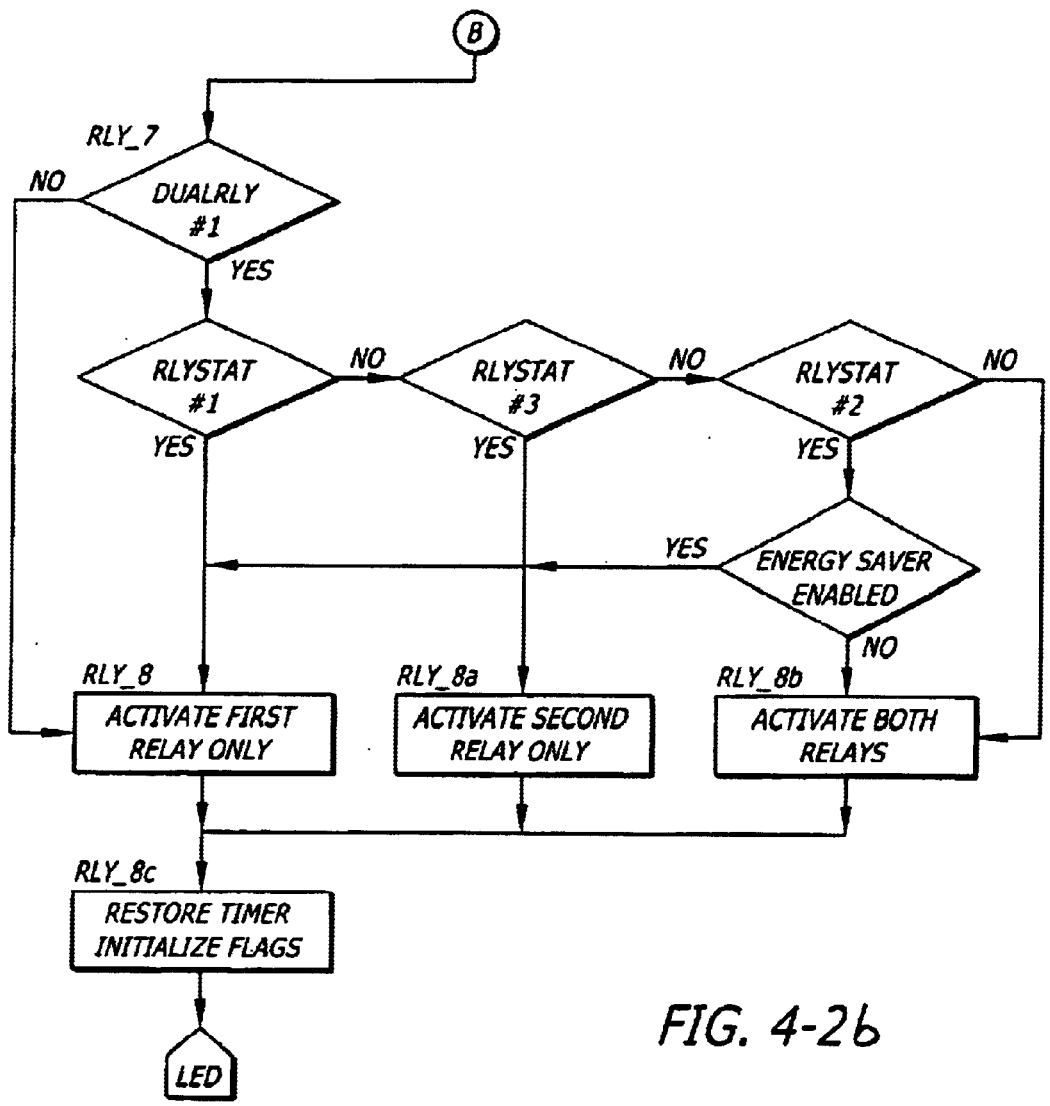

Referring to the drawings, and in particular to FIGS. 1–2, there is shown a system 10 for example for activating only one of two banks of lights 12, upon the sensing of entry into an area 14 which includes the two banks of lights 12, regardless of the last of a series of light-activating settings 16 selected by a user. The system 10 is incorporated in an apparatus 18 for sensing entry into the area 14 to control lighting therein. The entry into the area 14 may consist of initial detection of occupancy of the area 14. The system 10 forces and automatically activates only one bank of lights 12 to activate upon the sensing by the apparatus 18 of entry into the area 14. The area 14 may include a number of lighting fixtures 20, each of which is controlled by the apparatus 18 and the system 10, and each of which includes one of the two banks of lights 12. The area 14 may alternatively include a number of lighting fixtures 20, each of which is controlled by the apparatus 18 and the system 10, and each of which includes the two banks of lights 12.

The system 10 includes a selecting-enabling element 22 for enabling the selecting of one of the series of light-activating settings 16 for the two banks of lights 12 by the user. The series of light-activating settings 16 include a number of one-bank-only settings 24 for enabling the selecting of only one bank of lights 12, and a both-banks setting 26 for enabling the selecting of both banks of lights 12. The two banks of light 12 include a first lighting bank 28 and a second lighting bank 30, and the number of one-bank-only settings 24 include a first lighting bank only setting 32 and a second lighting bank only setting 34. The system 10 further includes a cycling-enabling element 36 for enabling cycling through the series of light-activating settings 16, and a system enabling-disabling element 38 which includes a system enabling setting 40 and a system disabling setting 42 for enabling the selecting of the enabling or disabling of the system 10. The cycling-enabling element 36 may comprises a touchplate momentary pushbutton control. The system enabling-disabling element 38 may constitute a dual in-line package (DIP) switch. The selecting-enabling element 22 may further include an off-lighting setting 44 for enabling the selecting of both banks of lights 12 to be off. The system 10 also includes an activating element 46 for activating only one bank of lights 12 upon entry into the area 14 regardless of the last of the series of light-activating settings 16 selected by the user.

Figure 3:
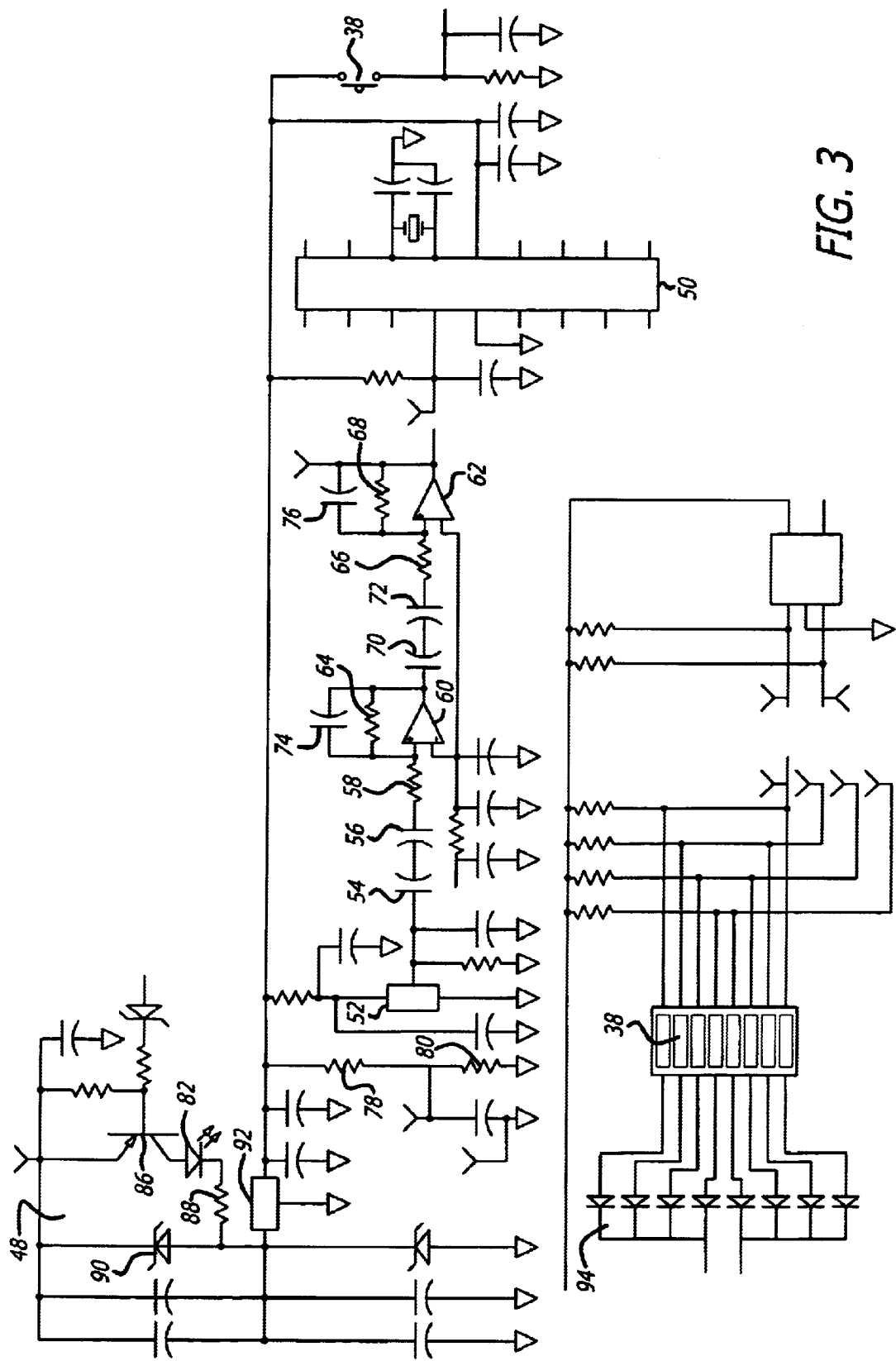
FIG. 3 is a circuit diagram of a section of the circuit in the lighting control system in accordance with the present invention.

As shown in FIG. 3, the apparatus 18 for example includes an infrared circuit 48, which detects changes in the heat signature within the controlled space. The type of heat that is detected is centered close to the body temperature of people. Therefore, when a person moves it results in changes to the heat signature which are detected and amplified and then sent to a microcontroller 50 for interpretation.

In the infrared circuit 48, signal coming from a passive pyro-electric detector 52 is fed through capacitors 54 and 56 along with resistor 58 to the input of an operational amplifier 60. The signal is further amplified by operational amplifier 62. Both amplifiers are AC coupled such that they amplify difference signals and not steady state signals. The bandwidth limited gain is set ratio-metrically with resistors 58 and 64 for the first amplifier and resistors 66 and 68 for the second stage. The high pass component of the bandwidth limits are set by capacitors 54 and 56 for the first stage, and capacitors 70 and 72 for the second stage. The low pass component is set by capacitors 74 for the first stage and 76 for the second stage. The amplifier circuit is operated from a single supply, therefore a DC bias voltage is needed, and is derived from the voltage divider comprised of resistors 78 and 80.

An LED 82 is used to indicate when occupancy has been detected. It is disabled during periods when lights are to remain off. In the LED control, a microcontroller 50 is fed to the base of transistor 86 thereby activating or deactivating the LED 82. LED 82 current is limited in two ways. First is resistor 88 which is in series with the LED 82. Second is the method employed within the microcontroller firmware to cycle the transistor very quickly at a short duty cycle to reduce the total power used. The cycling occurs much faster than the human eye can see, so it appears that the LED 82 is on constantly.

A method of stacking is employed such that the current used in each stack or circuit section can be re-used by each stack below that one. Therefore, when an LED 82 is activated for instance, the current flows through the LED 82 and into the lower portion of the circuit. When the LED 82 is not active, the current flows through a zener diode 90 into the lower stack. An LDO 92 is used to maintain a better degree of regulation for the microcontroller.

The microcontroller section consists of the microcontroller 50 itself along with its supporting circuitry, including the pushbutton 36 and DIP switch 38, which configure the product. The microcontroller 50 processes the incoming infrared signal and makes logic decisions and control output functions. The microcontroller 50 incorporates analog comparators with an internally controlled reference which is used to sense the power supply level and to process the amplified infrared signal.

Pushbutton switch 36 is a momentary tactile switch which toggles the state of the device and cycles through the lighting combinations. The DIP Switch 38 matrix is arranged to occupy as few a number of micro-controller pins as possible. Therefore a matrix is employed which is a 2×4 to accommodate the 8 DIP positions. A diode array 94 is used to properly isolate the switch settings as read by the microcontroller 50. Two control lines are shared with a standard non-volatile memory for remembering the last settings and configuration variables.

As shown in FIGS. 4-1 and 4-2, a flowchart for the relay activation portion of the firmware shows the information pertinent to this concept. If the processed decision is to activate the lights, the power supply charge is verified and the zero crossing is detected and synchronized. Which relay to activate is based upon the state of the device when it last was deactivated. If the stored relay status was 1, meaning that only lighting bank a was active, then only bank a is restored. If the relay status was 3, meaning that only lighting band b was active, then only bank b is restored.

If the relay status was 2, meaning that both lighting banks a and b were left on, then the device examines the state of the DIP switch position that selects an "Energy Saver" mode. If not selected then both banks of lights are restored according to the occupants preferences. If the feature is selected, then only lighting bank a is restored which then ensures greater energy savings.

As illustrated in FIGS. 1–2, in a method for example for the use of the system 10, the user may select the system enabling setting 40 in the system enabling-disabling element 38 such as the DIP switch, cycle through the light-activating settings 16 in the cycling-enabling element 36 such as the touchplate momentary pushbutton control, and select a light-activating setting 16, such as one of the one-bank-only settings 24, or the both-banks setting 26. Of the one-bank-only settings 24, the user may select the first lighting bank only setting 32, or the second lighting bank only setting 34.

The user may cycle through the system settings by using the touchplate momentary pushbutton control 36, which can be enabled or disabled through the setting in the DIP switch 38. When enabled, the control 36 will remember and return to the last lighting setting, only if one lighting bank was selected. If the last setting was both banks, the lighting will return to a first bank only upon re-entry.

Upon an entry into the area 14, such as initial detection of occupancy thereof, as sensed by the apparatus 18, the system 10 forces activation and automatically activates only one bank of lights 12, regardless of the last light-activating setting 16 selected by the user. In an area 14 which includes a plurality of lighting fixtures 20, each lighting fixture 20 may be a part of one of the two banks of lights 12, in which event only the lighting fixtures 20 in one of the two banks of lights 12 will be activated by the system 10. Where each lighting fixture 20 includes the two banks of lights 12, then only one of the two banks of light 12 in each lighting fixture 20 will be activated.

While the system 10 has been shown and described in connection with a lighting system, it may alternatively activate only a primary load when a switch is turned on to save energy for a type of load other than a lighting system, such as for example a multi-stage heating and air conditioning system, an alarm system, and/or a building automation system.

From the foregoing it will be appreciated that the system of the present invention provides advantages in energy saving lighting control systems, which forces only one bank of lighting to automatically activate upon initial detection of occupancy of an area. While several particular forms of the invention have been illustrated and described, it will be apparent that various modification can be made without departing from the spirit and scope of the invention. Accordingly, the invention is not to be limited, except as by the following claims.

What is claimed is:

1. A system for automatically activating only less than all of a plurality of banks of lights, upon automatically sensing entry into an area which includes the plurality of banks of lights, regardless of the last light-activating setting selected by a user, wherein the system is incorporated in an apparatus for sensing entry into the area, and wherein the system includes a plurality of selectable light-activating settings, comprising:

a selecting-enabling element for enabling the selecting by the user of one of a plurality of light-activating settings for the plurality of banks of lights, wherein the plurality of light-activating settings include a plurality of less-than-all-banks-only settings for enabling the selecting of only less than all of the plurality of banks of lights, and an all-banks setting for enabling the selecting of all of the plurality of banks of lights;

a sensing element for automatically sensing entry into the area which includes the plurality of banks of lights; and an activating element for automatically activating only less than all of the plurality of banks of lights upon the automatic sensing by the sensing element of entry into the area regardless of the last of the plurality of light-activating settings selected by the user.

2. The system of claim 1, wherein the entry into the area sensed by the apparatus comprises initial detection of occupancy.

3. The system of claim 1, wherein the system forces only less than all of the plurality of banks of lights to activate upon the sensing by the apparatus of an entry into the area.

4. The system of claim 1, wherein the system automatically activates only less than all of the plurality of banks of lights upon the sensing by the apparatus of an entry into the area.

5. The system of claim 1, wherein the selecting-enabling element further includes an off-lighting setting for enabling the selecting of all of the banks of lights to be off.

6. The system of claim 1, further comprising a cycling-enabling element for enabling the cycling through the plurality of light-activating settings.

7. The system of claim 6, wherein the cycling-enabling element comprises a touchplate momentary pushbutton control.

8. The system of claim 1, further comprising a system enabling-disabling element which includes a system enabling setting and a system disabling setting for enabling the selecting of the enabling or disabling of the system.

9. The system of claim 8, wherein the system enabling-disabling element comprises a dual in-line package switch.

10. The system of claim 1, wherein the plurality of banks of lights comprise two banks of light, the less than all of the plurality of banks of lights comprise one bank of lights, the plurality of less-than-all-banks-only setting comprises a plurality of one-bank-only settings, and the all-banks-setting comprises a both-banks setting.

11. The system of claim 10, wherein the two banks of light include a first lighting bank and a second lighting bank, and the plurality of one-bank-only settings include a first lighting bank only setting and a second lighting bank only setting.

12. The system of claim 10, wherein the area includes a plurality of lighting fixtures, each of which is controlled by the apparatus and the system, and each of which includes one of the two banks of lights.

13. The system of claim 10, wherein the area includes a plurality of lighting fixtures, each of which is controlled by the apparatus and the system, and each of which includes the two banks of lights.

14. A method of automatically activating only less than all of a plurality of banks of lights, upon automatically sensing entry into an area which includes the plurality of banks of lights, regardless of the last light-activating setting selected by a user, in a system which is incorporated in an apparatus for sensing entry into the area, wherein the system includes a plurality of selectable light-activating settings, and wherein the system comprises a selecting-enabling element for enabling the selecting by the user of one of a plurality of light-activating settings for the plurality of banks of lights, wherein the plurality of light-activating settings include a plurality of less-than-all-banks-only settings for enabling the selecting of only less than all of the plurality of banks of lights, and an all-banks setting for enabling the selecting of all of the plurality of banks of lights, a sensing element for automatically sensing entry into the area which includes the plurality of banks of lights, and an activating element for automatically activating only less than all of the plurality of banks of lights upon the automatic sensing by the sensing element of entry into the area regardless of the last of the plurality of light-activating settings selected by the user, wherein the method comprises:

automatically activating only less than all of the plurality of banks of lights upon the automatic sensing by the sensing element of entry into the area regardless of the last of the plurality of light-activating settings selected by the user.

15. The method of claim 14, wherein the entry into the area sensed by the apparatus comprises initial detection of occupancy, and wherein activating further comprises activating upon initial detection of occupancy.

16. The method of claim 14, wherein the system forces only less than all of the plurality of banks of lights to activate upon the sensing by the apparatus of an entry into the area, and wherein activating comprises forcing only one bank of lights to activate.

17. The method of claim 14, wherein the system automatically activates only less than all of the plurality of banks of lights upon the sensing by the apparatus of an entry into the area, and wherein activating comprises automatically activating only one bank of lights.

18. The method of claim 14, wherein the selecting-enabling element further includes an off-lighting setting for enabling the selecting of all of the banks of lights to be off, further comprising selecting the off-lighting setting.

19. The method of claim 14, further comprising a cycling-enabling element enabling the cycling through the plurality of light-activating settings, further comprising cycling through the plurality of light-activating settings in the cycling-enabling element.

20. The method of claim 19, wherein the cycling-enabling element comprises a touchplate momentary pushbutton control, further comprising cycling through the plurality of light-activating settings in the touchplate momentary pushbutton control.

21. The method of claim 14, further comprising a system enabling-disabling element which includes a system enabling setting and a system disabling setting for enabling the selecting of the enabling or disabling of the system, further comprising selecting the system enabling setting or the system disabling setting in the enabling-disabling element.

22. The method of claim 21, wherein the system enabling-disabling element comprises a dual in-line package switch, further comprising selecting the system enabling setting or the system disabling setting in the dual in-line package switch.

23. The method of claim 14, wherein the plurality of banks of lights comprise two banks of light, the less than all of the plurality of banks of lights comprise one bank of lights, the plurality of less-than-all-banks-only setting comprises a plurality of one-bank-only settings, and the all-banks-setting comprises a both-banks setting, and wherein activating comprises activating only one bank of lights upon entry into the area regardless of the last of the plurality of light-activating settings selected by the user.

24. The method of claim 23, wherein the two banks of light include a first lighting bank and a second lighting bank, and the plurality of one-bank-only settings include a first lighting bank only setting and a second lighting bank only setting, and wherein activating comprises activating only one bank of lights upon entry into the area regardless of whether the first lighting bank only setting or the second lighting bank only setting is the last setting selected by the user.

25. The method of claim 23, wherein the area includes a plurality of lighting fixtures, each of which is controlled by the apparatus and the system, and each of which includes one of the two banks of lights, and wherein activating comprises activating only one bank of lights in the plurality of lighting fixtures.

26. The method of claim 23, wherein the area includes a plurality of lighting fixtures, each of which is controlled by the apparatus and the system, and each of which includes the two banks of lights, and wherein activating comprises activating only one bank of lights in each of the plurality of lighting fixtures.

27. A system for automatically activating only less than all of a plurality of loads, upon automatically sensing entry into an area which includes the plurality of loads, regardless of the last load-activating setting selected by a user, wherein the system is incorporated in an apparatus for sensing entry into the area, and wherein the system includes a plurality of selectable load-activating settings, comprising:

a selecting-enabling element for enabling the selecting by the user of one of a plurality of load-activating settings for the plurality of loads, wherein the plurality of load-activating settings include a plurality of less-than-all-loads-only settings for enabling the selecting of only less than all of the plurality of loads, and an all-loads setting for enabling the selecting of all of the plurality of loads;

a sensing element for automatically sensing entry into the area which includes the plurality of banks of lights; and an activating element for automatically activating only less than all of the plurality of loads upon the automatic sensing by the sensing element of entry into the area regardless of the last of the plurality of load-activating settings selected by the user.

28. A system for automatically activating only less than all of a plurality of banks of lights, upon automatically sensing entry into an area which includes the plurality of banks of lights, regardless of the last light-activating setting selected by a user, wherein the system is incorporated in an apparatus for sensing entry into the area, and wherein the system includes a plurality of selectable light-activating settings, comprising:

selecting-enabling means for enabling the selecting by the user of one of a plurality of light-activating settings for the plurality of banks of lights, wherein the plurality of light-activating settings include a plurality of less-than-all-banks-only settings for enabling the selecting of only less than all of the plurality of banks of lights, and an all-banks setting for enabling the selecting of all of the plurality of banks of lights;

sensing means for automatically sensing entry into the area which includes the plurality of banks of lights; and activating means for automatically activating only less than all of the plurality of banks of lights upon the automatic sensing by the sensing means of entry into the area regardless of the last of the plurality of light-activating settings selected by the user.

29. A method of automatically activating only less than all of a plurality of banks of lights, upon automatically sensing entry into an area which includes the plurality of banks of lights, regardless of the last light-activating setting selected by a user, in a system which is incorporated in an apparatus for sensing entry into the area, wherein the system includes a plurality of selectable light-activating settings, and wherein the system comprises selecting-enabling means for enabling the selecting by the user of one of a plurality of light-activating settings for the plurality of banks of lights, wherein the plurality of light-activating settings include a plurality of less-than-all-banks-only settings for enabling the selecting of only less than all of the plurality of banks of lights, and an all-banks setting for enabling the selecting of all of the plurality of banks of lights, sensing means for automatically sensing entry into the area which includes the plurality of banks of lights, and activating means for automatically activating only less than all of the plurality of banks of lights upon the automatic sensing by the sensing means of entry into the area regardless of the last of the plurality of light-activating settings selected by the user, wherein the method comprises:

automatically activating only less than all of the plurality of banks of lights upon the automatic sensing by the sensing means of entry into the area regardless of the last of the plurality of light-activating settings selected by the user.

* * * * *